(12) United States Patent
Seguchi et al.

(10) Patent No.: US 8,231,742 B2
(45) Date of Patent: Jul. 31, 2012

(54) IRON-BASED COMPOSITE MATERIAL AND METHOD OF MANUFACTURING IRON-BASED COMPOSITE MATERIAL

(75) Inventors: Tsuyoshi Seguchi, Toyota (JP); Masatoshi Oguro, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 476 days.

(21) Appl. No.: 12/519,952

(22) PCT Filed: Nov. 9, 2007

(86) PCT No.: PCT/JP2007/072244
§ 371 (c)(1),
(2), (4) Date: Jun. 18, 2009

(87) PCT Pub. No.: WO2008/078472
PCT Pub. Date: Jul. 3, 2008

(65) Prior Publication Data
US 2010/0012228 A1    Jan. 21, 2010

(30) Foreign Application Priority Data
Dec. 27, 2006 (JP) ................... 2006-351181

(51) Int. Cl.
*C23C 8/22* (2006.01)
(52) U.S. Cl. ...................... 148/225; 148/319
(58) Field of Classification Search .......... 148/206, 148/225, 319
See application file for complete search history.

(56) References Cited

U.S. PATENT DOCUMENTS
4,313,758 A    2/1982    Henning et al.

FOREIGN PATENT DOCUMENTS

| | | |
|---|---|---|
| DE | 40 37 805 | 6/1992 |
| JP | 49-76151 | 7/1974 |
| JP | 59-87144 | 5/1984 |
| JP | 60-116761 | 6/1985 |
| JP | 62-38789 | 2/1987 |
| JP | 62-146280 | 6/1987 |
| JP | 1-202381 | 8/1989 |
| JP | 3-219014 | 9/1991 |
| JP | 8-157946 | 6/1996 |

OTHER PUBLICATIONS

S.F. Yur'ev and S.K. Ginzberg, Investigation of High-Temperature Carburizing of Steel in Solid Carburizer with High-Frequency Heating, Aug. 1959, Metallovedeniei Term. Obrabotka, pp. 32-38.*
Extended European Search Report for EP Application No. 07831974.6 dated Mar. 23, 2010.

* cited by examiner

*Primary Examiner* — Jessee R. Roe
(74) *Attorney, Agent, or Firm* — Finnegan, Henderson, Farabow, Garrett & Dunner, LLP

(57) ABSTRACT

To provide an iron-based composite material which has higher abrasion and seizure resistance, and more excellent impact absorbing property as compared with a steel material, and which has higher mechanical strength as compared with a cast iron material, and also a method of manufacturing the iron-based composite material. The iron-based composite material includes at least a steel structure layer 12, a cast iron structure layer 14, and a carburized structure layer 13 which is formed by carburizing the steel structure between the steel structure layer 12 and the cast iron structure layer 14.

5 Claims, 9 Drawing Sheets (a)

(b)

(a)

(b)

(c)

(a)

(b)

(a)

(b)

(a)

(b)

(c)

IRON-BASED COMPOSITE MATERIAL AND METHOD OF MANUFACTURING IRON-BASED COMPOSITE MATERIAL

CROSS-REFERENCE TO RELATED APPLICATIONS

This application is a national phase application of International Application No. PCT/JP2007/072244, filed Nov. 9, 2007, and claims the priority of Japanese Application No. 2006-351181, filed Dec. 27, 2006, the contents of both of which are incorporated herein by reference.

TECHNICAL FIELD

The present invention relates to an iron-based composite material in which at least carbon is contained in an iron-based material, and a method of manufacturing the iron-based composite material. More particularly, the present invention relates to an iron-based composite material having a plurality of structure layers, and a method of manufacturing the iron-based composite material.

BACKGROUND ART

Conventionally, iron-based materials have been used in a wide range of fields because the iron-based materials are more excellent in mechanical properties, such as ductility, malleability, and tensile strength, and also in workability, as compared with other metallic materials. In the iron-based material, a steel structure or a cast iron structure can be obtained by adjusting the carbon content according to the use of the material.

For example, the steel structure can be obtained by making carbon contained in pure iron material in the range of 0.03% by mass or more to less than 1.7% by mass. The material having the steel structure is generally referred to as carbon steel. The material (steel material) having such steel structure is excellent in ductility, malleability, and workability, and hence is used for applications such as those for structures, machine components, and tools.

Further, in order to improve abrasion resistance and fatigue resistance, the steel material may be subjected to carburizing treatment which makes carbon solid-dissolved and diffused from the surface of the steel material within the above described range by heating the surface of the steel material in a predetermined temperature atmosphere together with a solid carburizing agent, such as corks, or a gas carburizing agent such as hydrocarbon-based gas. By performing the carburizing treatment, a layer made of a carburized structure is formed in the surface of the steel material.

On the other hand, the cast iron structure can be obtained by making carbon contained in pure iron material in the range of 1.7% to 6.68% by mass. Practically, in many cases, the cast iron structure contains carbon in the range of 2.5% to 4.5% by mass, and further contains silicon, manganese, phosphorus, sulfur, and the like. The cast iron structure is inferior in ductility and malleability as compared with the steel structure. However, the cast iron structure has a large compressive strength and is excellent in machinability, abrasion resistance, and impact absorbing property (vibration damping property).

For example, a disk rotor made of cast iron is proposed as a member using a east iron material (see patent document 1). The disk rotor is a disk-like component which configures a disk brake of a vehicle, such as an automobile. The braking surface of the disk rotor, against which surface a brake pad is pressed, is made of flake graphite cast iron. Since the cast iron material is excellent in abrasion resistance and impact absorbing property as described above, the braking surface of the disk rotor is hardly worn out and is able to absorb the vibration at the time of braking. Thus, according to such disk rotor, it is possible to suitably brake the vehicle.

Patent Document 1: JP Patent Publication (Kokai) No. 62-146280A (1987)

DISCLOSURE OF THE INVENTION

However, in the case where the cast iron material as described in patent document 1 is used, the mechanical strength of the disk rotor is low as compared with the case where the steel material is used. As a result, it is necessary to increase the thickness of the disk rotor in order to obtain the desired strength. This results in an increase in the weight of the disk rotor and in difficulty in improving the fuel consumption of the vehicle.

In view of this problem, it is conceivable to manufacture the disk rotor by using the steel material instead of the cast iron material, in order to reduce the weight of the disk rotor while securing the strength. However, as described above, the steel material is inferior in abrasion resistance and seizure resistance as compared with the cast iron material. Thus, as compared with the disk rotor made of the cast iron material, in the disk rotor made of the steel material, the abrasion amount of the braking surface is increased, so that seizure may be generated in the braking surface.

Even when in order to improve the abrasion resistance as described above, the surface hardness of the braking surface is increased by subjecting the surface of the steel material to the carburizing treatment, there is a possibility that the abrasion of the brake pad, which is pressed against the disk rotor, may be further promoted in accordance with the increase in the surface hardness of the braking surface. Further, unlike tine braking surface including the cast iron structure, the braking surface subjected to the carburizing treatment does not contain graphite which acts as a lubricant, and hence has difficulty in suppressing the seizure on the braking surface in a similar manner as in the case where the cast iron material is used. Further, the impact absorbing property of the steel material is also low as compared with the east iron material. Thus, there is also a possibility that when the brake pad is pressed against the disk rotor, the disk rotor cannot absorb the impact load of the brake pad, so as to cause the disk brake itself to be vibrated.

The present invention has been made in view of the above described problems. An object of the present invention is to provide an iron-based composite material which has higher abrasion and seizure resistance, and more excellent impact absorbing property as compared with the steel material, and which has higher mechanical strength as compared with the cast iron material, and is also to provide a method of manufacturing the iron-based composite material.

In order to solve the above described problems, the iron-based composite material according to the present invention is characterized by including at least a steel structure layer, a cast iron structure layer, and a carburized structure layer which is formed by carburizing the steel structure between the steel structure layer and the cast iron structure layer.

According to the present invention, the iron-based composite material includes the cast iron structure layer which has the impact absorbing property, and thereby the vibration damping property of the iron-based composite material is improved as compared with the steel material. Further, since the iron-based composite material is based on the steel structure layer, it is possible to secure the mechanical strength of the iron-based composite material, which is equivalent to the mechanical strength of the steel material. Further, according to the present invention, in the case where the cast iron structure layer is arranged in the sliding surface, the carbon which exists in the surface of the cast iron structure layer can function as a solid lubricant, so as to improve the abrasion resistance and the seizure resistance. Further, the iron-based composite material according to the present invention includes the carburized structure layer which is formed by carburizing the steel structure layer between the cast iron structure layer and the steel structure layer, and thereby the abrasion resistance of the iron-based composite material can be improved as compared with the conventional cast iron material.

The "steel structure layer" described in the present invention is a layer made of a steel structure in which at least carbon is contained in the pure iron material in the range of 0.03% by mass or more to less than 1.7% by mass. Examples of crystalline structure of the steel structure layer in normal temperature include crystalline structures which include a crystalline structure containing at least one of martensite, troostite, sorbite, bainite, ferrite-cementite, and perlite. The crystalline structure can be obtained by suitably determining the conditions of heat treatment, the kind and content of metallic elements contained in the iron structure, and the carbon content. Among the crystalline structures, the ferrite-perlite structure, which can be used in the state of the hot forged structure as it is, is more preferred.

Further, the "cast iron structure layer" described in the present invention is a layer made of a cast iron structure in which at least carbon is contained in the pure iron material in the range of 1.7 to 6.68% by mass. Examples of the cast iron structure include a cast iron structure containing flake graphite (gray cast iron FC: JIS standard), a cast iron structure containing spheroidal graphite (spheroidal graphite cast iron FCD; JIS standard), and malleable cast iron structures, such as those of white heart malleable cast iron (FCMW: JIS standard), black heart malleable cast iron (FCMB JIS standard), and perlite cast iron (FCMP: JIS standard). The cast iron structure can be obtained by suitably determining the kind of additive elements and the conditions of heat treatment at the time when the cast iron structure is formed. Note that the cast iron structure containing flake graphite, which can act as a solid lubricant, is effective in the case of being used in a member having a sliding surface. More preferably, the cast iron structure layer is a cast iron structure containing spheroidal graphite. The cast iron structure layer containing spheroidal graphite has high mechanical strength and toughness as compared with the cast iron structure layer containing flake graphite, and is also able to further improve the abrasion resistance and seizure resistance.

Further, the "carburized structure layer" described in the present invention is a layer including a carburized structure formed by carburizing the steel structure. The carburized structure is a structure formed by further making carbon contained in the steel structure in the range of 0.03% by mass or more to less then 1.7% by mass.

More preferably, the carburized structure layer according to the present invention is formed such that carbon content is gradually increased along the direction from the steel structure layer to the cast iron structure layer. According to the present invention, there is included the carburized structure layer in which the carbon content is gradually increased along the direction from the cast iron structure layer having high carbon content to the steel structure layer having carbon content lower than that of the cast iron structure layer. Thereby, the cast iron structure layer and the steel structure layer can be more stably held.

As a member containing the iron-based composite material according to the present invention, it is more preferred that a disk rotor according to the present invention includes at least the cast iron structure layer as a surface layer including the braking surface. According to the present invention, since the cast iron structure layer is provided in the surface layer including the braking surface, it is possible to reduce the abrasion of the braking surface and to suppress the seizure of the braking surface. Further, the cast iron structure layer is more excellent in the impact absorbing property as compared with the steel material, and hence is also able to absorb the impact of the disk rotor at the time of braking. Further, since the carburized structure layer and the steel structure layer are provided in the inner side of the surface layer of the braking surface, it is possible to reduce the weight of the disk rotor, while securing the mechanical strength equal to or higher than that of the conventional disk rotor. Thereby, it is possible to improve the fuel consumption of a vehicle.

As another embodiment of a member including the iron-based composite material according to the present invention, it is more preferred that a vibration damping steel plate according to the present invention includes at least the cast iron structure layer as an intermediate layer in the thickness direction of the plate. According to the present invention, since the cast iron structure layer is more excellent in vibration damping property as compared with the steel material, the vibration damping steel plate, which includes the cast iron structure layer as the intermediate layer in the plate thickness direction, has vibration damping property equivalent to that of a vibration damping steel plate formed by sandwiching a resin between steel plates. Further, since the cast iron structure layer is provided instead of the resin, it is possible to reduce the weight of the vibration damping steel plate according to the present invention as compared with the vibration damping steel plate using the resin. Further, the vibration damping steel plate may be formed by laminating a plurality of cast iron structure layers as intermediate layers of the vibration damping steel plate. In such vibration damping steel plate, it is possible to further improve the vibration damping property of the vibration damping steel plate according to the increase in the number of the cast iron structure layers.

Further, as another embodiment of a member containing the iron-based composite material according to the present invention, it is more preferred that a steel pipe according to the present invention includes at least the cast iron structure layer as the surface layer of at least one of the outer peripheral surface and the inner peripheral surface of the steel pipe. According to the present invention, the steel pipe includes the cast iron structure layer, and hence is capable of damping vibration even in the case where external force acts on the steel pipe. As a result, the stress concentration due to the vibration is reduced at a portion where the steel pipes are connected, for example, by welding. Thereby, a crack is hardly generated at the portion, so that a highly reliable steel pipe can be obtained.

Further, as the present invention, there is also disclosed a manufacturing method suitable for manufacturing the iron-based composite material. The method of manufacturing the iron-based composite material according to the present invention is characterized by including: at least a process of bringing a carbon material into contact with the surface of at least a part of a steel structure of a steel material including the steel structure; and a process of maintaining the contact state and heating at least the surface of the steel structure under a temperature condition of the eutectic point temperature of cast iron or higher so that a cast iron structure layer including a cast iron structure is formed in the surface of the steel material.

According to the present invention, at least the surface is heated under the temperature condition of the eutectic point temperature of cast iron (1148° C.) or higher while the carbon material is brought into contact with the surface of the steel material, and hence the cast iron structure layer is formed in the surface layer of the steel material, which surface is in contact with the carbon material. Further, in the under layer of the cast iron structure layer, there is also obtained a carburized structure layer in which carbon content is gradually increased along the direction from the surface layer (cast iron structure layer) to the inside (steel structure layer). In this way, it is possible to obtain an iron-based composite material including at least the steel structure layer, the cast iron structure layer, and the carburized structure layer which is formed by carburizing the steel structure between the steel structure layer and the cast iron structure layer. Further, the cast iron structure layer including the cast iron structure is obtained by bringing the carbon material into contact with the surface of the steel structure, and hence the carbon content (amount of graphite) in the surface of the cast iron structure layer tends to be increased. As a result, the surface of the cast iron structure layer is formed into a surface which is excellent in sliding property so as to be hardly subjected to abrasion and seizure as compared with the surface of the cast iron material having the same average carbon content. Note that the upper limit temperature of the heating temperature is preferably set at a temperature that is lower than the temperature at which the transformation of δ iron occurs, and specifically, that is lower than 1394° C. which is A4 transformation point. In the case where the heating temperature is the upper limit temperature or higher, the δ iron transformation is caused, so that the amount of carbon which is solid-dissolved is reduced.

The "carbon material" described in the present invention is a member or powder which contains carbon as a main material, and is not particularly limited as long as the material is a member made of a carbon allotrope which is capable of making carbon solid-dissolved and diffused through the surface of the steel material, and which is, for example, power made of graphite as industrial carbon, a member formed by compacting the powder, a member made of graphite, or the like.

In the method of manufacturing the iron-based composite material according to the present invention, it is more preferred that in the heating process, the heating is performed in an inert gas atmosphere. According to the present invention, when at least the surface of the steel material is heated in the inert gas atmosphere, it is possible to make carbon more efficiently solid-dissolved in the steel material, and possible to prevent the surface of the steel material from being oxidized.

In the method of manufacturing the iron-based composite material according to the present invention, it is more preferred that in the heating process, the contact state is maintained while the carbon material is pressed against the surface of the steel material. According to the present invention, by pressing the carbon material against the surface of the steel material, it is possible to make carbon solid-dissolved into the steel structure.

The method of manufacturing the iron-based composite material according to the present invention further includes a process in which the heal treatment for the steel structure is performed to the member subjected to the heating process. According to the present invention, the heat treatment is performed to the steel structure layer of the iron-based composite material, which is obtained in the heating process, and hence it is possible to obtain the crystalline structure as described above. Note that the heat treatment is a treatment process in which a crystalline structure of the iron-based composite material can be obtained in correspondence with the mechanical strength required for the iron-based composite material. Examples of the heat treatment process include treatment processes of annealing, normalizing, hardening, tempering, or the like. Further, such treatment processes may also be combined so as to be performed as the heat treatment process. For example, when the steel structure is desired to be further hardened, there is performed hardening treatment for heating under the temperature condition higher than the A1 transformation point. When the toughness is desired to be improved, there is performed tempering treatment for heating under the temperature condition lower than the A1 transformation point.

In the method of manufacturing the iron-based composite material according to the present invention, it is more preferred that in the contact process, at least one of magnesium powder and magnesium alloy powder is further arranged on the contact surface of the steel structure with the carbon material, and that in the heating process, there is formed a cast iron structure layer including a spheroidal graphite cast iron structure as the cast iron structure.

According to the present invention, the magnesium-based powder is arranged on the contact surface, and the steel material is heated in the state where the carbon material is brought into contact with the contact surface. Thereby, the graphite in the cast iron structure can be easily spheroidized and a layer of a spheroidal graphite cast iron structure can be easily formed. The spheroidal graphite cast iron structure obtained in this way is more excellent in abrasion resistance and seizure resistance, and has higher tensile strength and elongation percentage, as compared with the flake graphite cast iron structure. Therefore, the spheroidal graphite cast iron structure is particularly suitable for a sliding member and a structural member. Note that examples of elements for spheroidizing the graphite in the cast iron structure include elements, such as magnesium, cerium, and calcium. Among these elements, magnesium is more preferred because it is capable of spheroidizing the graphite less expensively and more surely than the other elements.

Further, as another embodiment, magnesium or a magnesium alloy may also be contained at least in the surface of the carbon material, which surface is brought into contact with the steel structure. In this way, when magnesium or a magnesium alloy is contained in the carbon material, the need to arrange the magnesium powder is eliminated, so that the working efficiency is improved.

The present invention is a method of manufacturing a disk rotor, which includes the method of manufacturing the iron-based composite material, and in which it is preferred that in the contact process, the carbon material is brought into contact with at least the braking surface of the disk rotor, and that in the heating process, at least the braking surface is heated. In the disk rotor manufactured according to the present invention, at least the cast iron structure layer can be formed as the surface layer including the braking surface of the disk rotor.

Further, as another embodiment, the present invention is a method of manufacturing a vibration damping steel plate, which includes the method of manufacturing the iron-based composite material, and which may be configured such that in the contact process, the carbon material is arranged between two steel plates as the steel material, so as to bring the carbon material into contact with the steel plates, and that in the heating process, the heating is performed until the two steel material surfaces in contact with the carbon material are joined with each other. The method of manufacturing the vibration damping steel plate may also be configured such that steel plates as the steel material and the carbon material are successively laminated so as to bring the carbon material brought into contact with the respective steel plates, and that in the heating process, the heating is performed until the laminated steel material surfaces in contact with the carbon material are at least joined with each other.

The vibration damping steel plate manufactured according to the present invention can have al least the cast iron structure layer as the intermediate layer in the thickness direction of the plate. Further, the carbon of the carbon material is solid-dissolved and diffused in the steel plate, and the two steel plates are heated at a temperature of the eutectic point or higher. Thus, the two steel plates are easily joined with each other via the cast iron structure. Further, similarly, even in the case where the steel plates and the carbon material are laminated, the steel plates are easily joined with each other via the cast iron structure because of the same reason as described above. Further, when the laminated body of the steel plates and the carbon material is heated in the heating process, it is preferred that the laminated body is pressed in the thickness direction of the plate. By pressing in this way, the carbon material arranged between the steel plates can be pressed against the surface of the steel plates. Thereby, it is possible to make the carbon uniformly solid-dissolved and diffused in the steel sheet surfaces.

Further, as another embodiment, the present invention is a method of manufacturing a steel pipe, which includes the method of manufacturing the iron-based composite material, and in which it is more preferred that in the contact process, the carbon material is arranged on the surface of one or both of the outer peripheral surface and the inner peripheral surface of the steel pipe as the steel material, so as to be brought into contact with the steel pipe. In the steel pipe manufactured according to the present invention, at least the east iron structure layer can be formed as the surface layer of at least one of the outer peripheral surface and the inner peripheral surface of the steel pipe.

According to the present invention, it is possible to obtain an iron-based composite material which has higher abrasion and seizure resistance, and excellent impact absorbing property as compared with the steel material, and which has higher mechanical strength as compared with the cast iron material.

This application incorporates the content described in the specification and/or accompanying drawings of Japanese Patent Application No. 2006-351181 from which this application claims the benefit of priority.

BRIEF DESCRIPTION OF THE DRAWINGS

FIG. 1 is a figure for explaining an iron-based composite material according to the present embodiment and a method of manufacturing the iron-based composite material, in which FIG. 1(a) is a sectional view of the iron-based composite material, and FIG. 1(b) is a figure for explaining the method of manufacturing the iron-based composite material shown in FIG. 1(a).

FIG. 2 is a figure showing structure photographs of the iron-based composite material shown in FIG. 1(a), in which FIG. 2(a) is a figure showing a cast iron structure layer. FIG. 2(b) is a figure showing a carburized structure layer, and FIG. 2(e) is a figure showing a steel structure layer.

FIG. 3 is a figure for explaining a disk rotor containing the iron-based composite material shown in FIG. 1, and a part of a method of manufacturing the disk rotor, in which FIG. 3(a) is a sectional view of the disk rotor, and FIG. 3(b) is a figure for explaining the part of the method of manufacturing the disk rotor shown in FIG. 3(a).

FIG. 4 is a figure for explaining a vibration damping steel plate containing the iron-based composite material shown in FIG. 1, and a part of a method of manufacturing the vibration damping steel plate, in which FIG. 4(a) is a sectional view of the vibration damping steel plate, and FIG. 4(b) is a figure for explaining the part of the method of manufacturing the vibration damping steel plate shown in FIG. 4(a).

FIG. 5 is a figure for explaining a vibration damping steel plate according to another embodiment containing the iron-based composite material shown in FIG. 4, and a part of a method of manufacturing the vibration damping steel plate, in which FIG. 5(a) is a sectional view of the vibration damping steel plate, and FIG. 5(b) is a figure for explaining the part of the method of manufacturing the vibration damping steel plate shown in FIG. 5(a).

FIG. 6(a) is a sectional view of the steel pipe, FIG. 6(b) is a figure for explaining the part of the method of manufacturing the steel pipe shown in FIG. 6(a), and FIG. 6(c) is a figure for explaining the part of the method of manufacturing another steel pipe.

Figure 1:
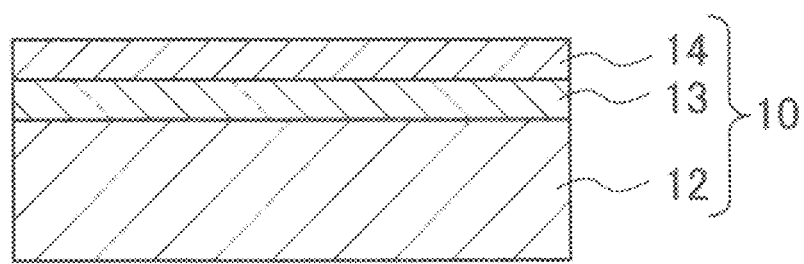
Figure 1:
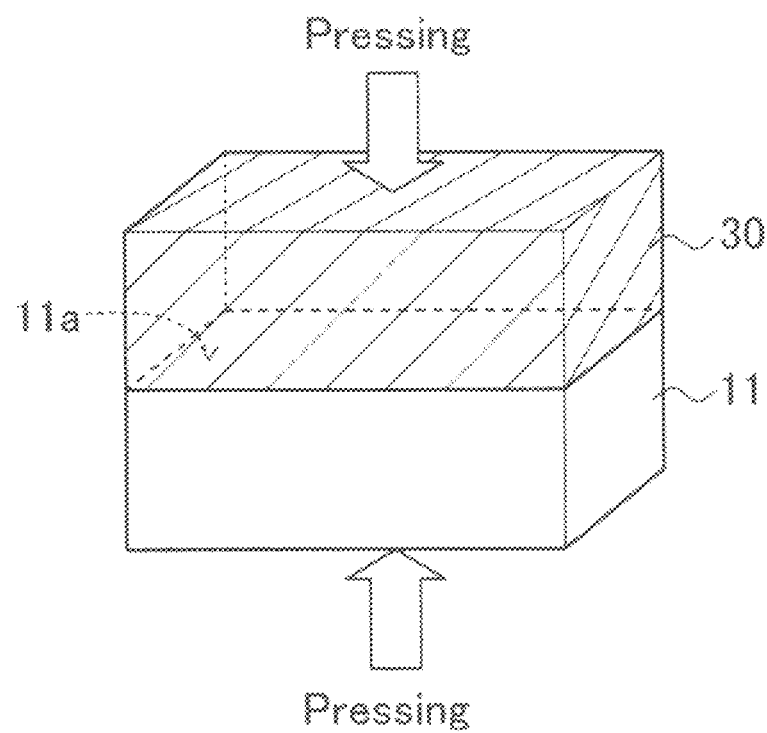

In the figures, reference numeral 10 denotes an iron-based composite material, reference character 10A denotes a disk rotor, reference character 10B denotes a vibration damping steel plate, reference character 10D denotes a steel pipe, reference character 10a denotes a braking surface, reference character 10c denotes an outer peripheral surface, reference character 10d denotes an inner peripheral surface, reference numeral 11 denotes a steel material, reference numeral and characters 12, 12A, 12B, 12C and 12D denote steel structure layers, reference numeral and characters 13, 13A, 13B, 13C and 13D denote carburized structure layers, reference numeral and characters 14, 14A, 14B, 14C and 14D denote cast iron structure layers, reference numeral and characters 30, 30A, 30B, 31D, 32D and 33D denote carbon materials, reference numeral 40 denotes a block test piece, reference numeral 50 denotes a ring test piece, reference numeral 60 denotes a bathtub, and reference character T denotes the plate thickness direction.

BEST MODE FOR CARRYING OUT THE INVENTION

Note that in the following, with reference to the accompanying drawings, there will be described an embodiment of an iron-based composite material according to the present invention and an embodiment of a method of manufacturing the iron-based composite material, and there will also be described several application examples of the iron-based composite material according to the present embodiment.

Figure 2:
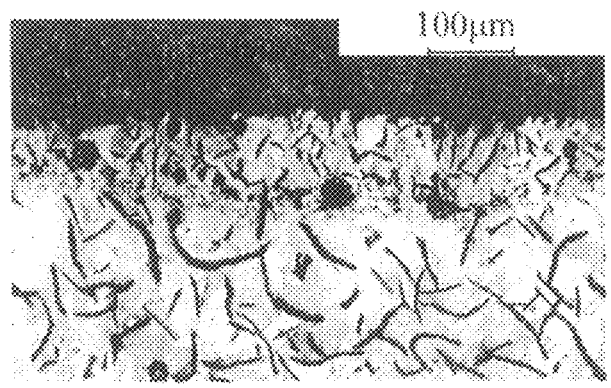
Figure 2:
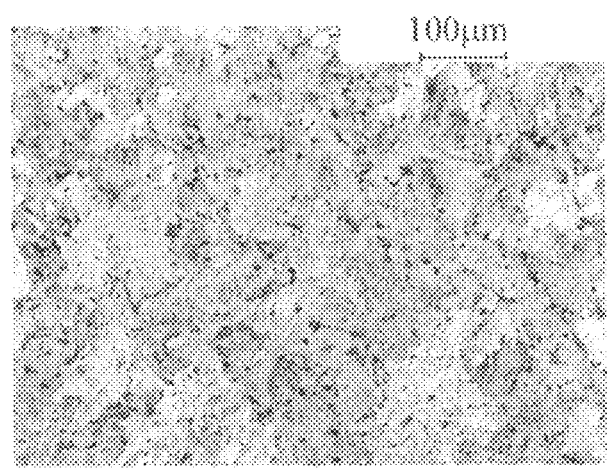
Figure 2:
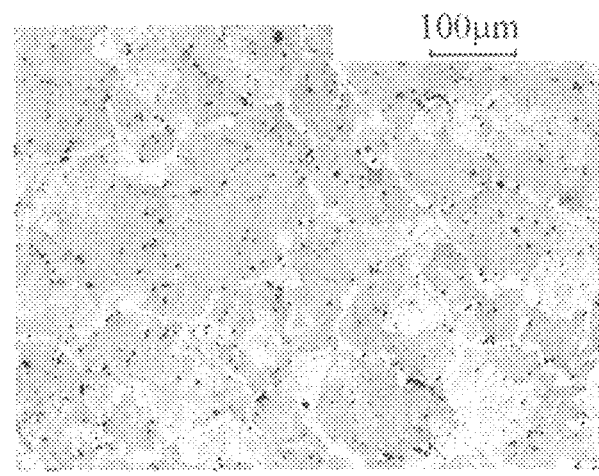

FIG. 1 is a figure for explaining an iron-based composite material according to the present embodiment and a method of manufacturing the iron-based composite material, in which FIG. 1(a) is a sectional view of the iron-based composite material, and FIG. 1(b) is a figure for explaining the method of manufacturing the iron-based composite material shown in FIG. 1(a). Further, FIG. 2 is a figure showing structure photographs of the iron-based composite material shown in FIG. 1(a), in which FIG. 2(a) is a figure showing a cast iron structure layer, FIG. 2(b) is a figure showing a carburized structure layer, and FIG. 2(c) is a figure showing a steel structure layer.

As shown in FIG. 1(a), an iron-based composite material 10 according to the present invention is a material formed by combining three different layers in each of which iron is used as a main material, and includes at least a steel structure layer 12, a cast iron structure layer 14, and a carburized structure layer 13 which is formed by carburizing the steel structure between the steel structure layer 12 and the cast iron structure layer 14. Further, the carburized structure layer 13 is formed so that the carbon content is gradually increased along the direction from the steel structure layer 12 to the cast iron structure layer 14. Specifically, the carburized structure layer 13 in the vicinity of the east iron structure layer 14 is formed to have the carbon content close to the carbon content of the cast iron structure layer 14, and the carburized structure layer 13 in the vicinity of the steel structure layer 12 is formed to have the carbon content close to the carbon content of the steel structure layer 12.

Such iron-based composite material 10 can be manufactured by a manufacturing method as shown in FIG. 1(b). Specifically, first, there are prepared a steel material 11 having a steel structure and a carbon material 30. Next, the carbon material 30 is brought into contact with the surface 11a of at least a part of the steel structure of the steel material 11 (contact process). Then, the materials are put in an inert gas atmosphere furnace (not shown), while the contact state is maintained. Then, at least the surface 11a of the steel structure of the steel material 11 is heated under the temperature condition of the eutectic point (1148° C.) of cast iron or higher to the transformation point (1394° C.) of δ iron or less, so that a cast iron structure layer having a cast iron structure is formed in the surface 11a of the steel material 11 (heating process).

Further, in the heating process, the surface 11a of the steel structure is heated under the above described temperature condition while the contact state between the carbon material 30 and the surface 11a of the steel material 11 is maintained by pressing (pressurizing) the carbon material 30 against the surface 11a of the steel material 11, as shown in FIG. 1(b). By pressing in this way, it is possible to promote the solid dissolution and diffusion of carbon into the steel material structure.

In the iron-based composite material manufactured by the above describe manufacturing method, there can be obtained, in order from the surface in contact with the carbon material 30, the cast iron structure layer 14 having a grey cast iron structure containing flake graphite as shown in FIG. 2(a), the carburized structure layer 13 which is formed by carburizing the steel structure of the steel material 11 as shown in FIG. 2(b) (in which carbon is further solid-dissolved in the steel structure), and the heat treated steel structure layer 12 as shows in FIG. 2(c) (in which the crystalline structure is shown by a structure photograph of a ferrite-perlite structure).

Note that in the present embodiment, the cooling rate of the steel structure subjected to the heating process may be controlled so that the crystalline structure of the steel structure layer 12 shown in FIG. 2(c) is formed into another structure. Further, in the present embodiment, the carbon material 30 is simply brought into contact with the steel material 11. However, the healing process may also be performed in such a manner that powder made of magnesium or a magnesium alloy is arranged between the carbon material 30 and the steel material 11. By using the powder, the flake graphite contained in the cast iron structure layer is spheroidized, and thereby it is possible to obtain a cast iron structure layer having a spheroidal graphite cast iron structure.

The iron-based composite material 10 manufactured in this way has higher abrasion and seizure resistance and excellent impact absorbing property as compared with the steel material, because of having the cast iron structure layer 14. Further, the iron-based composite material 10 has higher mechanical strength as compared with the cast iron material, because of having the steel structure layer 12. Because of such properties, the iron-based composite material 10 is suitable for a machine component, a structural member, and the like.

In the following, there will be described, with reference to FIG. 3 to FIG. 6, several application examples of the machine component, the structural member, and the like, in which the iron-based composite material 10 is used.

Figure 3:
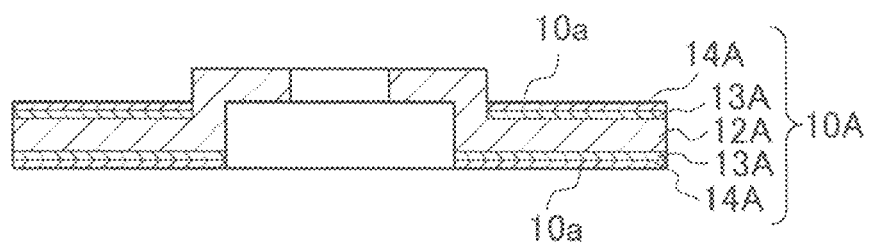
Figure 3:
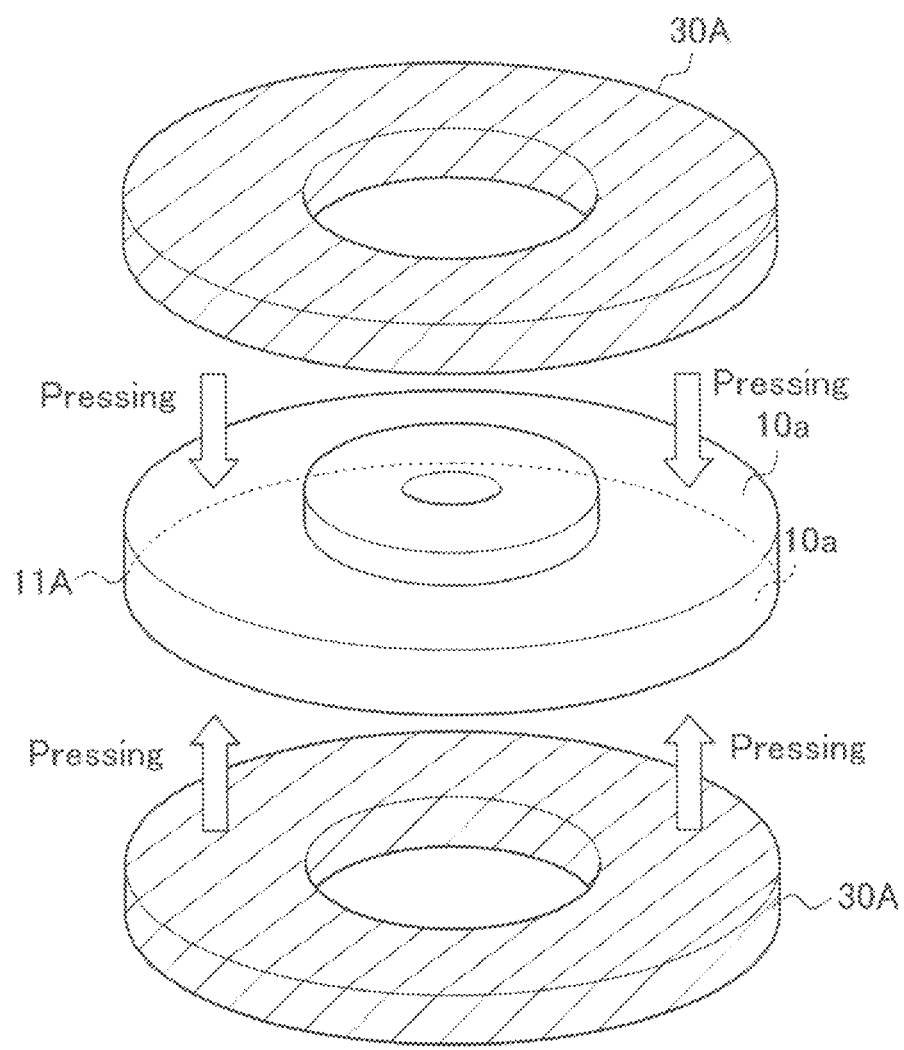

FIG. 3 is a sectional view showing a disk rotor 10A containing the iron-based composite material according to the present embodiment. The disk rotor 10A, which is a member configuring a disk brake (not shown) and having a disc-like shape, is connected to the end portion (not shown) of the axle of a vehicle, so as to be rotated together with the axle. Further, the disk brake is configured such that when braking the vehicle, brake pads (not shown) arranged so as to sandwich the braking surface 10a of the disk rotor 10A are pressed against the braking surface 10a.

As shown in FIG. 3(a), the disk rotor 10A is configured by at least a east iron structure layer 14A as a surface layer including the braking surface 10a, a steel structure layer 12A as a base material, and a carburized structure layer 13A which is formed by carburizing the steel structure between the steel structure layer 12A and the cast iron structure layer 14A.

The disk rotor 10A configured in this way is capable of reducing abrasion of the braking surface 10a and suppressing seizure of the braking surface 10a, because of having the cast iron structure layer 14A in the surface layer including the braking surface 10a. Further, the cast iron structure layer 14A is also more excellent in impact absorbing property as compared with the steel material, and hence is also capable of absorbing impact from the brake pad at the time of braking. Further, the disk rotor 10A includes the carburized structure layer 13A, and the steel structure layer 12A in the inside from the cast iron structure layer 14A of braking surface 10a. Thus, it is possible to reduce the weight of the disk rotor 10A by reducing the thickness thereof while securing the mechanical strength equal to or higher than the mechanical strength of the conventional disk rotor made only of the cast iron material. Thereby, it is possible to improve the fuel consumption of the vehicle.

The disk rotor 10A can be manufactured as will be described below. Specifically, as shown in FIG. 3(b), there are prepared a disk rotor 11A made of the steel material, and ring-shaped carbon materials 30A having the same shape as that of the braking surface of the disk rotor 11A. Next, in the above described contact process according to the present embodiment, the two ring-shaped carbon materials 30A are brought into contact with at least the braking surfaces 10a of the disk rotor 11A made of the steel material so as to sandwich the braking surfaces 10a. Then, in the above described heating process according to the present embodiment, while the contact state is maintained by pressing the carbon material 30A against the braking surface 10a of the disk rotor 11A made of the steel material, the carbon of the carbon material 30A is solid-dissolved and diffused in the braking surface 10a until at least the cast iron structure layer 14A is formed as the surface layer including the braking surface 10a. Note that in the case where the disk rotor 10A is manufactured, when the cast iron structure layer 14A is manufactured by using the above described magnesium based powder, so as to contain spheroidal graphite, it is possible to obtain the braking surface 10a which is more excellent in abrasion resistance.

Figure 4:
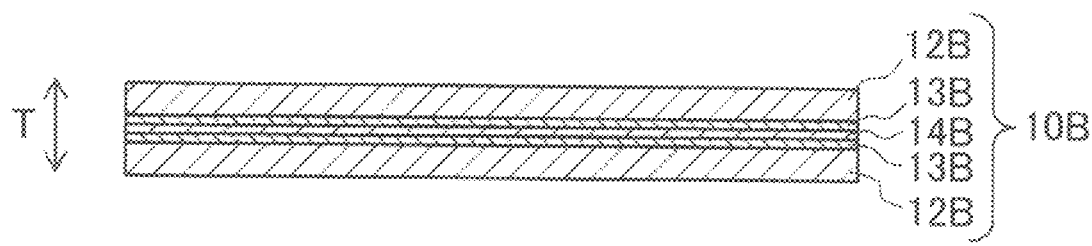
Figure 4:
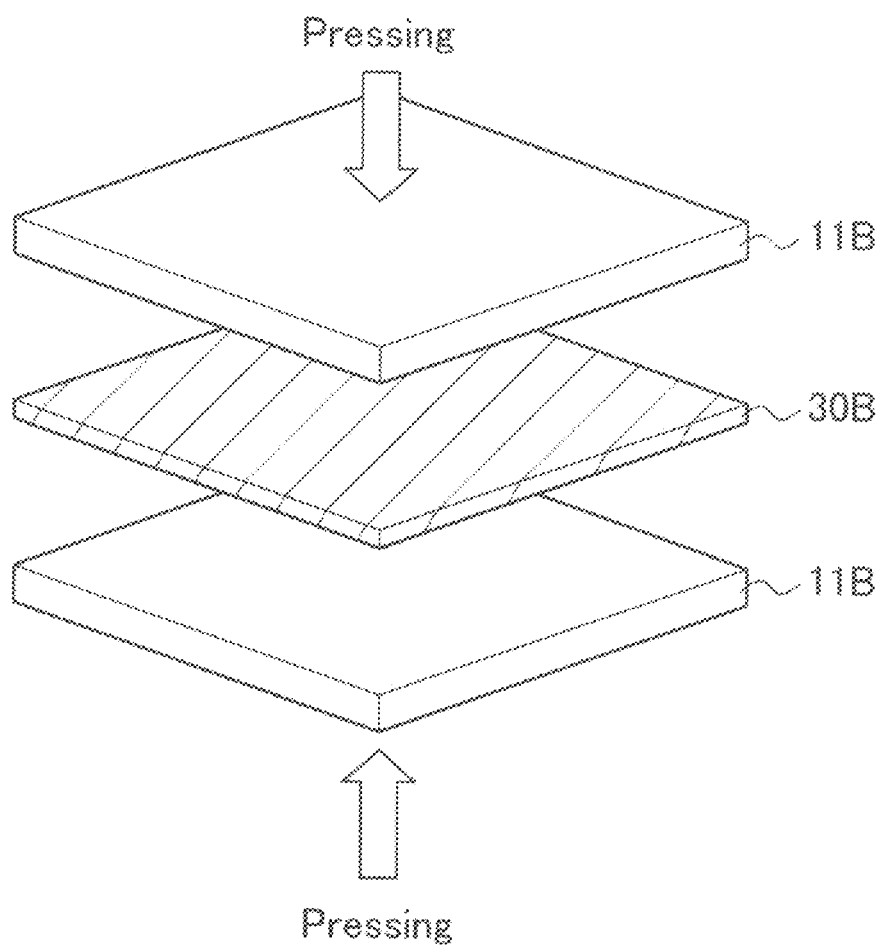

FIG. 4 is a figure showing a vibration damping steel plate 10B containing the iron-based composite material according to the present embodiment. As shown in FIG. 4(a), the vibration damping steel plate 10B is configured by a steel structure layer 12B as the surface layer, and by, as intermediate layers in the plate thickness direction T, at least a cast iron structure layer 14B and a carburized structure layer 13B which is formed by carburizing the steel structure between the steel structure layer 12B and the cast iron structure layer 14B.

The cast iron structure layer 14B is more excellent in vibration damping property than the steel. Thus, the vibration damping steel plate 10B configured in this way can have the same vibration damping property as that of a vibration damping steel plate formed by sandwiching a resin between steel plates because of having the cast iron structure layer 14B as the intermediate layer in the plate thickness direction T.

The vibration damping steel plate 10B can be manufactured as will be described below. Specifically, as shown in FIG. 4(b), there are prepared two steel plates 11B as the steel material, and a sheet-like carbon material 30B having substantially the same size as that of the surface of the steel plate 11B. Next, in the above describe contact process according to the present embodiment, the two steel plates 11B are arranged so as to face each other, and further the carbon material 30B is arranged between the two steel plates 11B. Then, the carbon material 30B is brought into contact with the surface of the steel plates 11B by pressing the mutually facing steel plates 11B against each other. Then, similarly to the above described heating process according to the present embodiment, while the carbon of the carbon material 30B is solid-dissolved and diffused in the steel plates 11B, the heating is performed until the surfaces of the two steel plates, which surfaces are in contact with the carbon material 30B, are at least joined with each other.

According to such manufacturing method, the carbon of the carbon material 30B is solid-dissolved and diffused in the steel plate 11B, and two steel plates 11B are heated at a temperature of the eutectic point of cast iron or higher. Thus, the two steel plates are easily joined with each other. Further, in the vibration damping steel plate 10B manufactured by this manufacturing method, there is formed the carburized structure layer 13B in which carbon content is gradually increased along the direction from the cast iron structure layer 14B with high carbon content to the steel structure layer 12B with carbon content lower than that of the cast iron structure layer 14B. Thus, even when the vibration damping steel plate 10B is subjected to working accompanied by plastic deformation, such as press working, the vibration damping steel plate 10B is capable of stably maintaining the cast iron structure layer and the steel structure layer.

Figure 5:
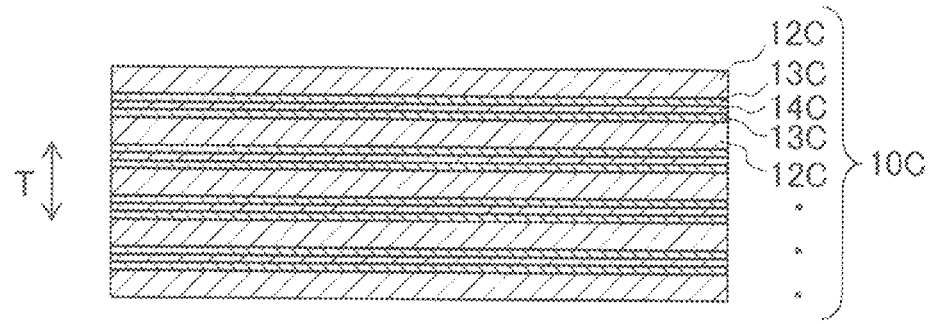
Figure 5:
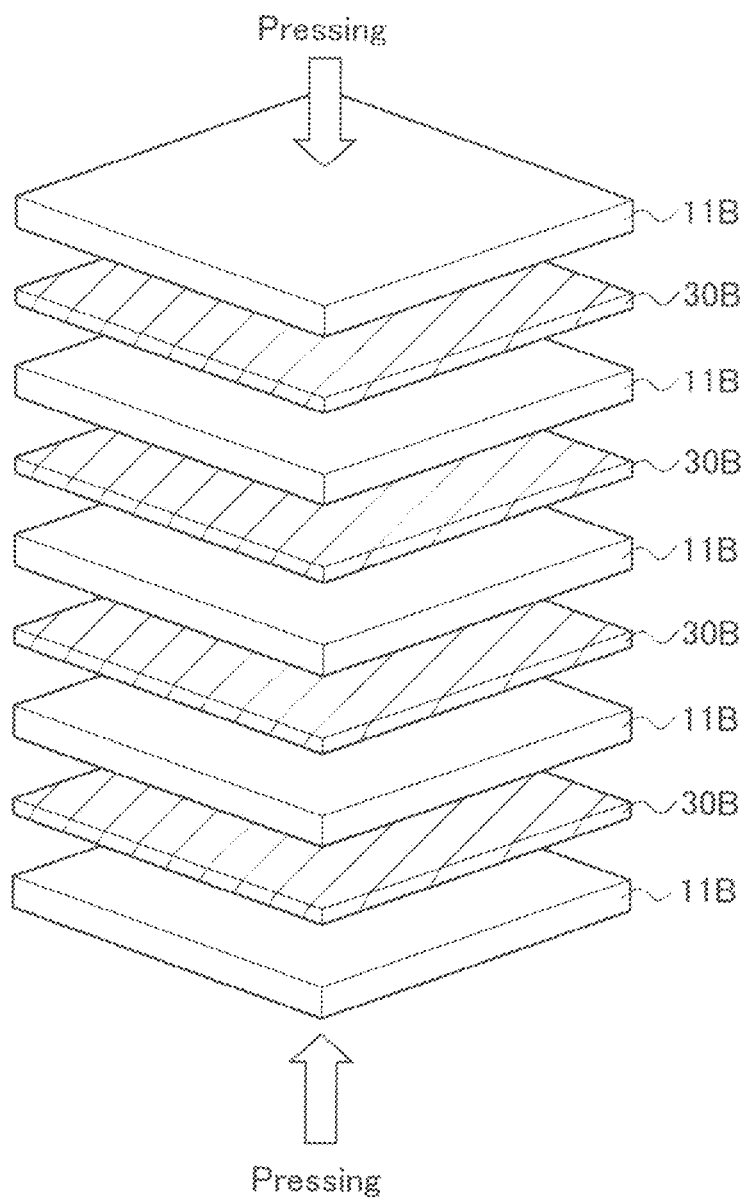

FIG. 5 is a figure showing a modification of the vibration damping steel plate 10B. As shown in FIG. 5(a), the vibration damping steel plate 10C is formed by laminating a plurality of cast iron structure layers 14C as intermediate layers in the plate thickness direction T. As the method of manufacturing the vibration damping steel plate 10C, as shown in FIG. 5(b), the sheet-like carbon materials 30B (four sheets of carbon materials in the figure) are respectively arranged between the plurality of steel plates 11B (five sheets of steel plates in the figure). Then, in the contact process, the carbon material 30B is brought into contact with the surface of the steel plate 11B by pressing the steel plates 11B located on the upper and lower sides toward each other. Then, in the heating process, while the carbon of the carbon material 30B is solid-dissolved and diffused in the steel plate 11B, the heating is performed until the surfaces of the steel plates, which surfaces are respectively in contact with the carbon material 30B, are joined with each other. In this way, it is possible to obtain the steel plate having high vibration damping property.

Figure 6:
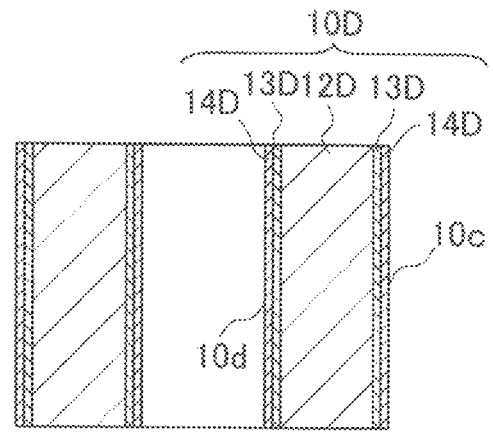
FIG. 6 is a figure for explaining steel pipes respectively containing the iron-based composite material shown in FIG. 1, and a part of manufacturing methods of the steel pipes, in which figure
Figure 6:
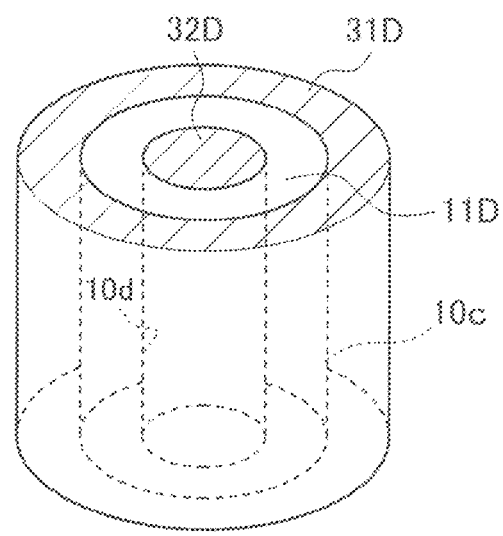
Figure 6:
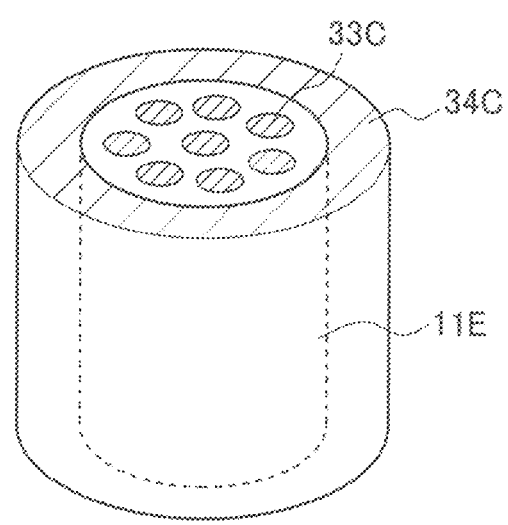

FIG. 6 is a figure showing a steel pipe 10D containing the iron-based composite material according to the present embodiment. As shown in FIG. 6(a), the steel pipe 10D includes at least a steel structure layer 12D serving as a base material, a cast iron structure layer 14D formed as the surface layer of the outer peripheral surface 10c and the inner peripheral surface 10d of the steel pipe 10D, and a carburized structure layer 13D which is formed by carburizing the steel structure between the steel structure layer 12D and the cast iron structure layers 14D. Note that in the steel pipe 10D, the cast iron structure layer 14D is formed in the outer peripheral surface 10c and the inner peripheral surface 10d. However, according to the use purpose of the steel pipe, the cast iron structure layer 14D may be formed in one of the outer peripheral surface 10c and the inner peripheral surface 10d. The steel pipe 10D configured in this way includes the cast iron structure layer 14D. Thus, even when external force acts on the steel pipe 10D, the steel pipe 10D is capable of damping the vibration due to the external force.

The steel pipe 10D can be manufactured as will be described below. Specifically, as shown in FIG. 6(b), there are prepared a steel pipe 11D as the steel material, a cylindrical carbon material 31D which covers the steel pipe 11D from the outside, and a columnar carbon material 32D which is filled in the steel pipe 11D. Next, in the above described contact process according to the present embodiment, the cylindrical carbon material 31D is brought into contact with the outer peripheral surface 10c of the steel pipe 11D made of the steel material, and the columnar carbon material 32D is brought into contact with the inner peripheral surface 10d of the steel pipe 11D. Then, in the above described heating process according to the present embodiment, the heating is performed so that the carbon of the carbon materials 31D and 32D is solid-dissolved and diffused in the steel pipe 11D so that the cast iron structure layer 14D is formed in the surface layers.

Note that as shown in FIG. 6(c), in the case of a steel pipe 11E having therein a plurality of through holes for passing liquid, a columnar carbon material 33C is arranged in each of the through holes. Further, the columnar carbon material 33C is brought into contact with the inner peripheral surface of each of the through holes, and a cylindrical carbon material 34C is brought into contact with the outer peripheral surface of the steel pipe 11D. Thereby, a cast iron structure layer can be formed in the surface layer of each of the through holes by performing the heating process.

Example

In the following, an example will be described on the basis of the present embodiment.

(Example)

A steel material having a size of 6.5 mm×15.7 mm, and a thickness of 10 mm (manganese steel 38MnS6: DIN standard) was prepared. Then, in the state where a carbon material formed by compacting and molding carbon powder to have the 6.5 mm×15.7 mm surface was pressed against the steel material under a pressure condition of 5 MPa, the materials were put in a furnace, so as to be heated for 15 minutes under a temperature condition of 1150° C. (the eutectic point temperature of cast iron or higher). Thereby, an iron-based composite material having a cast iron structure layer of a thickness of 300 μm was manufactured.

[Evaluation Method]

<Structure Observation>

Figure 7:
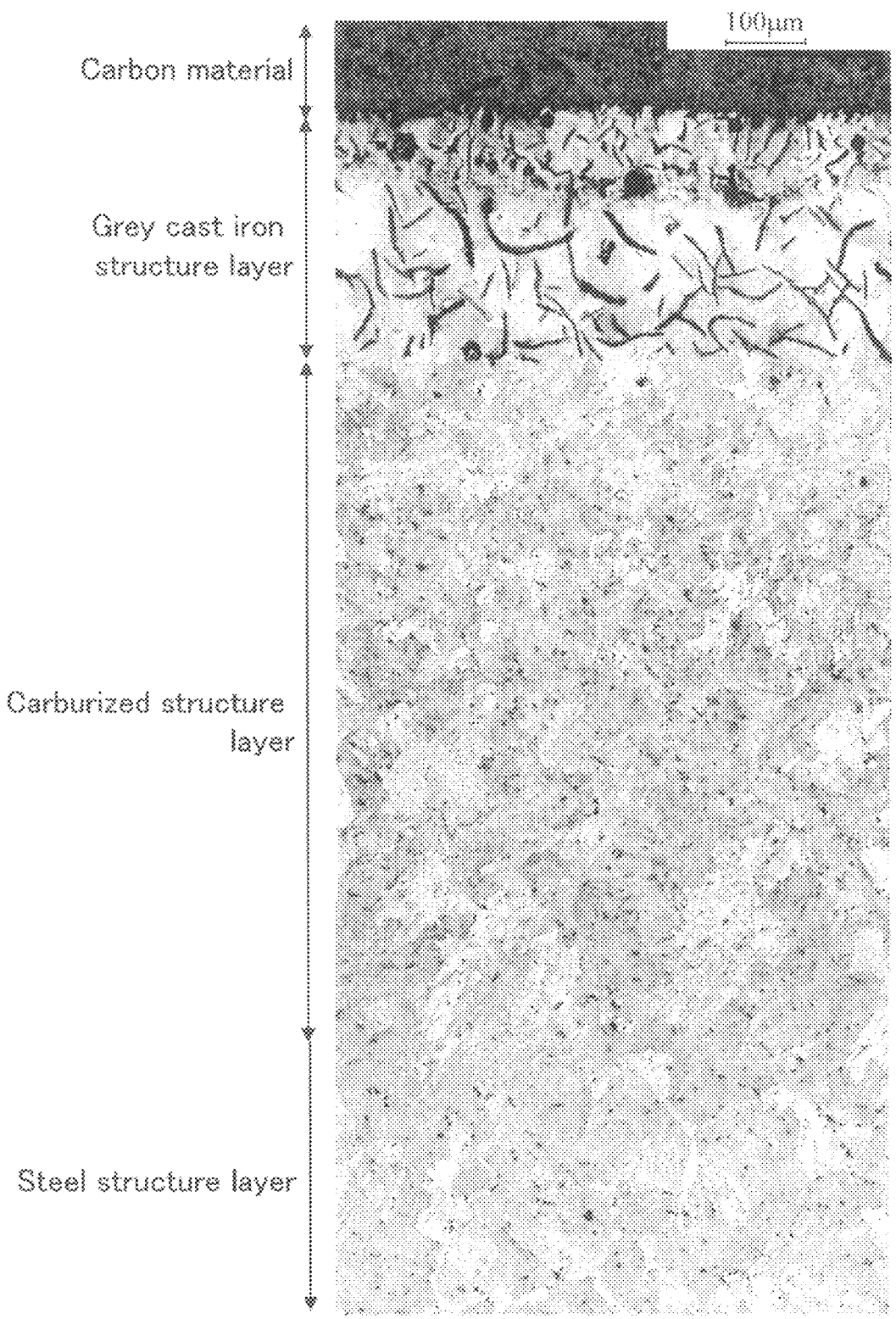
FIG. 7 is a figure showing a structure photograph of the iron-based composite material according to the present embodiment.

The structure of the iron-based composite material was observed by a microscope. The observation result is shown in FIG. 7.

<Surface Hardness Test>

Figure 8:
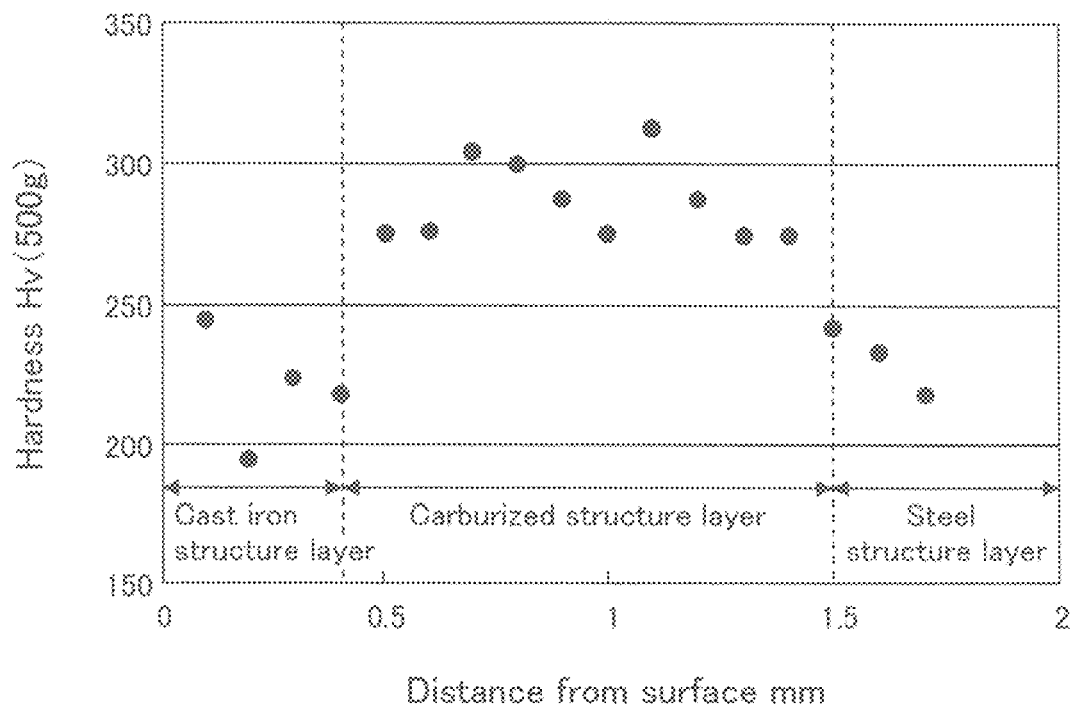
FIG. 8 is a figure showing a result obtained by measuring the surface hardness of the iron-based composite material according to the present embodiment.

For every 0.1 mm from the surface in which the cast iron structure layer of the iron-based composite material was formed, the surface hardness of the iron-based composite material was measured by using the Vickers testing machine under a test load of 500 g. The measured result is shown in FIG. 8.

<Abrasion Test>

Figure 9:
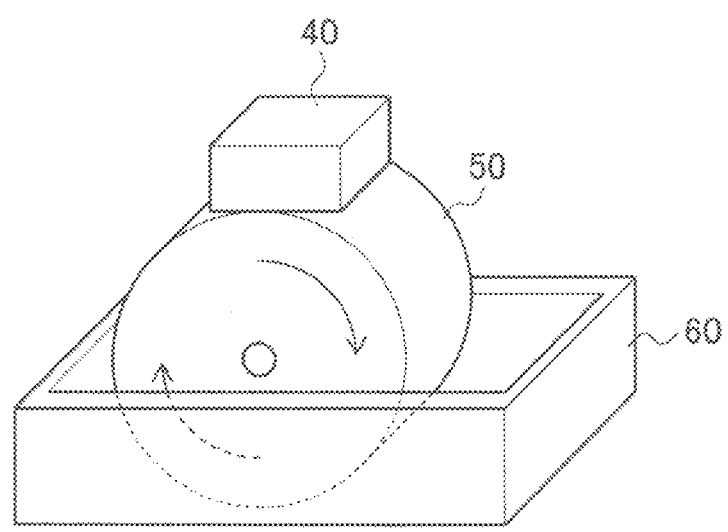
FIG. 9 is a conceptual figure of an apparatus for performing an abrasion test.
Figure 10:
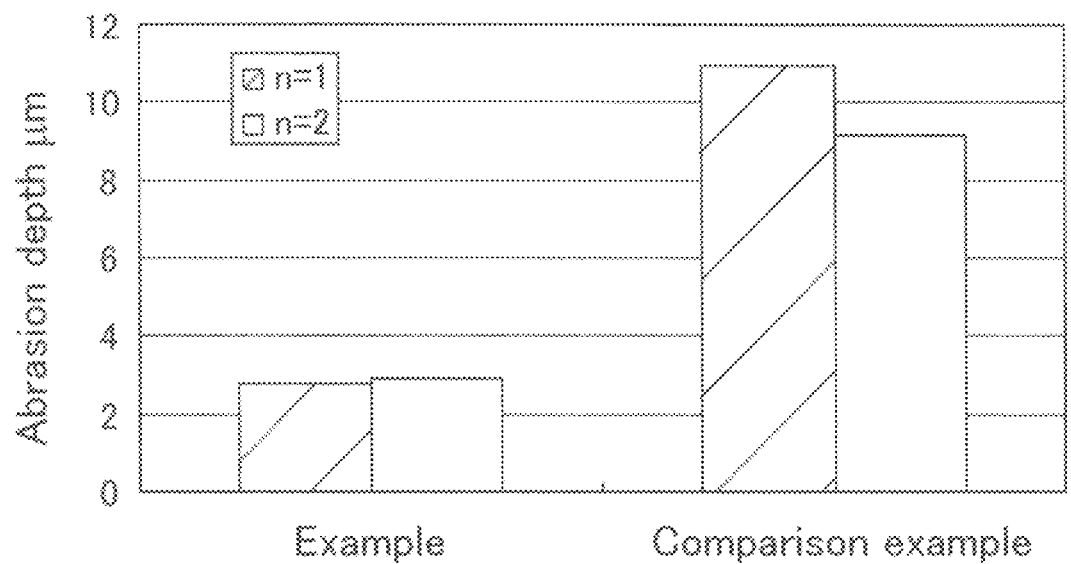
FIG. 10 is a figure showing a result obtained by measuring the abrasion depth of the materials according to the present embodiment and a comparison example.

The abrasion amount of the iron-based composite material was measured by using an abrasion testing machine shown in FIG. 9. Specifically, lubricating oil (JWS3090) 100 cc was supplied to a bathtub 60, and a ring test piece (SAE4620) 50 having a diameter of 35 mm and a thickness of 10 mm was arranged in the bathtub 60. In this slate, the 6.5 mm×15.7 mm surface of a block-shaped test piece (block test piece) 40 made of the iron-based composite material was pressed against the side surface of the ring test piece 50 under a pressure of 10 kgf. Then, the abrasion depth of the block test piece 40 was measured in such a manner that the ring test piece was rotated at 160 rpm for 15 minutes so as to allow the lubricating oil to be supplied to the pressed portion between the ring test piece 50 and the block test piece 40. Such test was performed twice. The test result is shown in FIG. 10.

(Comparison Example)

Figure 11:
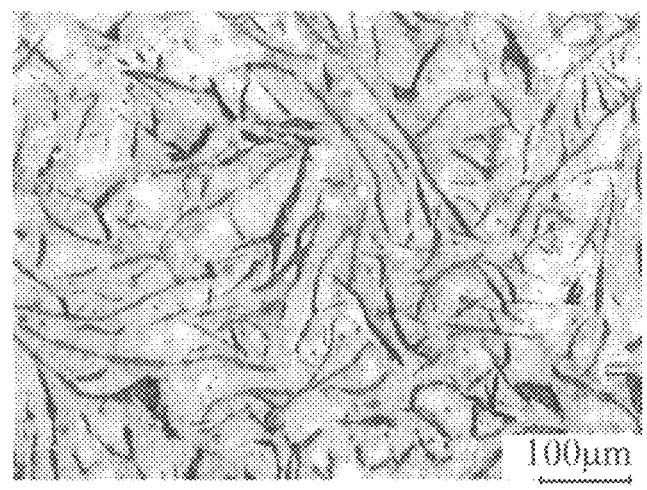
FIG. 11 is a figure showing a structure photograph of the material according to the comparison example.

The grey cast iron material (FC23: JIS standard) having the same dimensions as those of the example was prepared. Then, the structure was observed similarly to the case of the example. The observation result is shown in FIG. 11. Further, the abrasion test was performed under the same condition as that in the example. The test result is shown in FIG. 10.

[Result 1]

As shown in FIG. 7 and FIG. 11, it could be confirmed that the iron-based composite material of the example includes a steel structure layer made of a ferrite-perlite structure, a grey cast iron structure layer containing flake graphite, and a carburized structure layer which is formed by carburizing the steel structure between the steel structure layer and the cast iron structure layer. Further, it was confirmed that flake graphite was contained in the comparison example.

[Result 2]

From the result of structure observation as shown in the result of FIG. 8 and the result of the surface hardness test shown in FIG. 9, it was confirmed that the cast iron structure layer has the average surface hardness of Hv230, that the carburized structure layer has the average surface hardness of Hv300, and that the steel structure layer has the average surface hardness of Hv220.

[Result 3]

As shown in FIG. 10, the abrasion depth of the example was about one third of that of the comparison example.

[Consideration]

The following two points can be considered as the reason that the example was more difficult to be worn as compared with the comparison example. First, it is considered that the example was more difficult to be worn as compared with the comparison example because there is included in the example the carburized structure layer which is formed by carburizing the steel structure layer between the cast iron structure layer and the steel structure layer, and which has higher hardness as compared with the cast iron structure layer and the steel structure layer, and because when the cast iron structure layer is included in the surface layer, the carburized structure layer thus acts as a back-up material for the cast iron structure layer. Second, it is considered that the surface of the cast iron structure layer of the example was in contact with the carbon material at the time of manufacture, so as to thereby have higher carbon content as compared with the cast iron material of the comparison example. For this reason, it is considered that the example is more difficult to be worn as compared with the comparison example.

As described above, the embodiment according to the present invention has been described with reference to the accompanying drawings but specific configurations are not limited to the embodiment. Even when design changes are performed within the spirit and scope of the present invention, they are included in the scope of the present invention.

For example, the disk rotor, the vibration damping steel plate, and the steel pipe have been described as application examples of the present embodiment, but the application examples are not limited to these. The present embodiment may be applied to a structural element and a machine component, in which the abrasion resistance and the vibration damping property are required.

Further, the iron-based composite material according to the present embodiment contains carbon, but may further contain additive elements, such as Cr, S, Si, P and Mo, as long as abrasion resistance and the vibration damping property are acquired.

The invention claimed is:

1. A method of manufacturing an iron-based composite material comprising: at least
   a process of bringing a carbon material into contact with the surface of at least a part of a steel structure of a steel material; and
   a process of maintaining the contact state and heating at least the surface under a temperature condition of the eutectic point temperature of cast iron or higher so that a cast iron structure layer including a cast iron structure is formed in the surface,
   wherein in the heating process, the heating is performed in an inert atmosphere.

2. The method of manufacturing the iron-based composite material according to claim 1, wherein in the heating process, the contact state is maintained while the carbon material is pressed against the surface of the steel material.

3. The method of manufacturing the iron-based composite material according to claim 1, further comprising a process in which an additional heat treatment of the steel structure is performed to the member subjected to the heating process.

4. The method of manufacturing the iron-based composite material according to claim 1, wherein in the contact process, at least one of magnesium powder and magnesium alloy powder is arranged on the contact surface of the carbon material of the steel structure, and wherein in the heating process, a cast iron structure layer including a spheroidal graphite cast iron structure is formed as the cast iron structure.

5. A method of manufacturing a disk rotor, which includes the method of manufacturing the iron-based composite material according to claim 1, wherein in the contact process, the carbon material is brought into contact with at least a braking surface of the disk rotor, and wherein in the heating process, the heating is performed to at least the braking surface.

* * * * *